United States Patent [19]

Yen et al.

[11] 4,232,738
[45] Nov. 11, 1980

[54] PETROLEUM RECOVERY PROCESS USING NATIVE PETROLEUM SURFACTANTS

[75] Inventors: Teh F. Yen, Altadena; Paul A. Farmanian, Glendale, both of Calif.

[73] Assignee: University of Southern California, Los Angeles, Calif.

[21] Appl. No.: 958,291

[22] Filed: Nov. 6, 1978

[51] Int. Cl.³ .................... E21B 43/16; E21B 43/20
[52] U.S. Cl. ............................. 166/274; 73/151; 208/366; 252/8.55 D; 252/356
[58] Field of Search .............. 166/274; 252/8.55 D; 208/357, 366

[56] References Cited

U.S. PATENT DOCUMENTS

| | | | |
|---|---|---|---|
| 2,217,385 | 10/1940 | Schulze et al. | 208/357 X |
| 3,163,214 | 12/1964 | Csaszar | 166/274 |
| 3,927,716 | 12/1975 | Burdyn et al. | 166/274 X |
| 3,929,190 | 12/1975 | Chang et al. | 166/274 |

OTHER PUBLICATIONS

Seifert et al., Anal. Chem. 41 (4), 554–562 (1969).
Johnson, J. Petrl. Tech. 28 (1), 85–92 (1976).
Cooke et al., J. Petrl. Tech. 26 (12), 1365–1374 (1974).

*Primary Examiner*—Richard D. Lovering
*Attorney, Agent, or Firm*—Robert Berliner; Byard G. Nilsson; Billy A. Robbins

[57] ABSTRACT

Isolation of native petroleum surfactants for lowering interfacial tensions in aqueous-alkaline systems. Petroleum of the type having reduced interfacial tension with water at high pH is subjected to fractionation by distillation including distillation under vacuum in the temperature range of 100°–200° C. to recover a surfactant fraction of the petroleum distilled in that temperature range. The fraction can be further concentrated by removing benzene-soluble components to obtain an ether-soluble residue having a density greater than water. The fraction alone, mixed with petroleum, or enriched with the residue, or the residue mixed with petroleum, can be injected as a slug into a subterranean oil reservoir to enhance tertiary recovery by alkaline water flooding. The amenability of a reservoir for alkaline flooding can be determined by separating the native surfactant fraction and measuring its interfacial tension with water at the proposed alkalinity of the floodwater.

28 Claims, 4 Drawing Figures pH RANGE
SOLID NATIVE SURFACTANT
DASHED ORIGINAL CRUDE
(OPEN)

○ DISTILLED H₂O
△ 7500 ppm NaCl

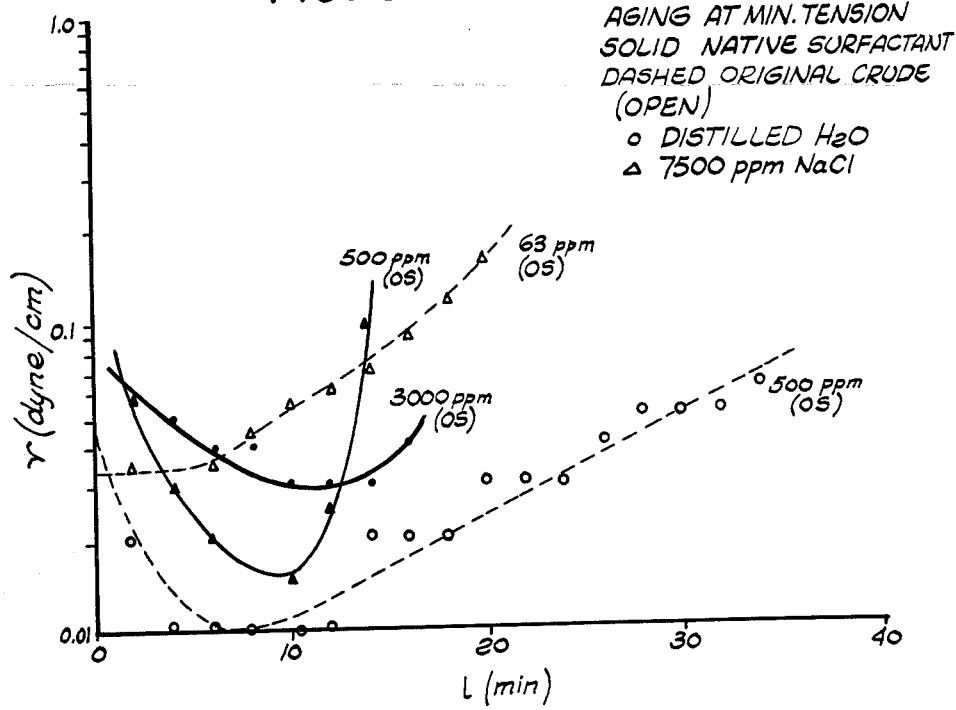
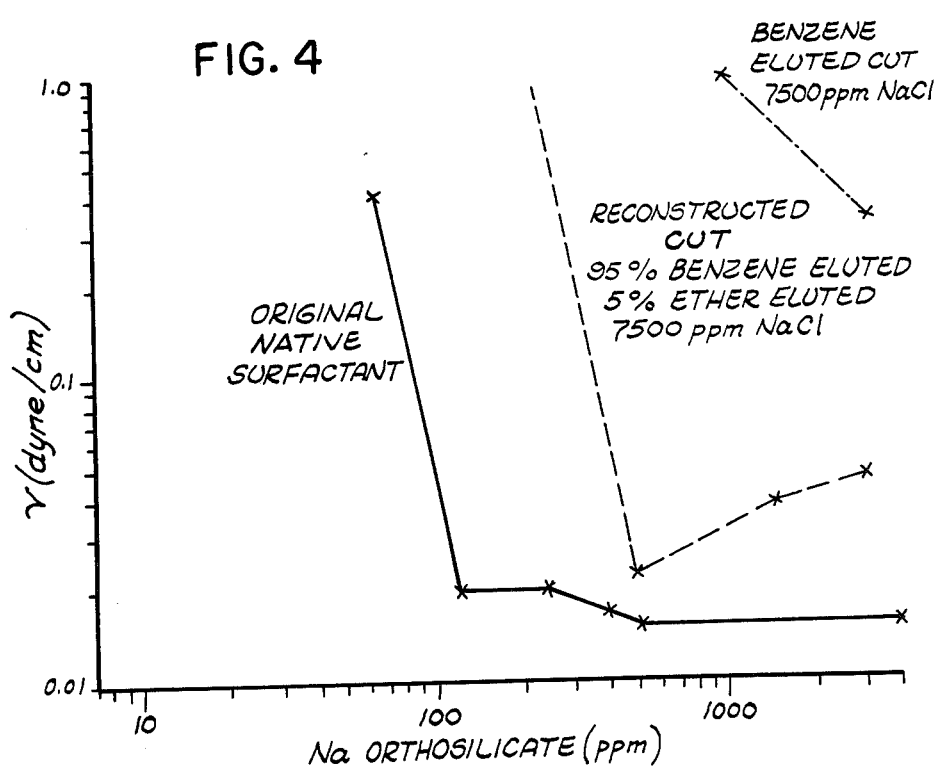

PETROLEUM RECOVERY PROCESS USING NATIVE PETROLEUM SURFACTANTS

FIELD OF THE INVENTION

The field of art to which the invention pertains includes the field of tertiary oil recovery and the field of surfactants.

BACKGROUND AND SUMMARY OF THE INVENTION

Since only a portion of the oil contained in a petroleum reservoir can be recovered by primary methods, it has become conventional practice to employ various secondary and tertiary recovery techniques to produce additional quantities of oil. Of the various secondary and tertiary methods available, one of the most widely practiced techniques is the displacement of oil from the reservoir with a driving fluid such as floodwater injected for that purpose. Normally in carrying out the flooding process, a series of input wells spaced apart from one or more producing wells are drilled into and opened to the oil-producing strata. Aqueous drive fluid, such as water, brine, or a viscous aqueous polymer solution, is injected into the reservoir under pressure, forcing some of the oil towards the producing well or wells.

While water flooding has been rather widely practiced in recent years, it is not without considerable operating problems and economic limitations, particularly those associated with low oil recoveries in proportion to the amount of water injected. Various surfactant and solvent floods have been proposed as means for recovering additional quantities of oil over that recoverable by conventional water flooding. Synthetic surfactants are expensive and the total amount of synthetic surfactant employed in a given waterflood operation is generally quite high because of the very large total amount of water which has to be introduced into a given partially depleted oil-bearing formation treated by the waterflood technique. This raises the cost of recovery to a figure which is sometimes exorbitant and frequently uneconomical because of the relatively high price of the surfactant, particularly when the total cost of the waterflood operation is compared with the amount of oil recovered by the use of this technique. On the other hand, crude petroleum is known to contain varying amounts of surfactant-yielding materials. These have generally been thought of as being simply saponifiable materials such as petroleum acids which can react with alkaline materials to form soaps that reduce the interfacial tension between the crude petroleum and water. Accordingly, the use of alkaline waterflooding, to activate such surfactants as a tertiary recovery mechanism, has been extensively investigated. Seifert and Howells, Anal. Chem. 41 (4), 554 (1969) persistently fractionated the many acidic components of a California crude oil into minute quantities, by a sequence of exhaustive back extractions, in an effort to ascertain their interfacial activities. However, none of the fractions isolated revealed surface tensions lower than that of the original crude oil except when measurement was highly dependent upon the alkaline concentration, so narrow a range of pH as to preclude any given practical use. A similar phenomenon is experienced with crude oils having a significantly high content of saponifiable material: low interfacial tension is exhibited primarily at a narrow pH range resulting to tolerances for alkaline flooding which are difficult to achieve.

It is now apparent that the alkaline water-flooding method for enhanced oil recovery is a complex process. Investigators have identified compounds other than carboxylic acids, such as phenols or porphyrins, as beneficial to oil recovery due to the low interfacial tensions they exhibit. Johnson, J. Petrl. Tech. 85 (January 1976), has outlined requirements other than ultralow surface tension to insure efficient, stable recovery of a given oil in a given reservoir, e.g., spontaneous emulsification, entrainment, entrapment, wettability reversal in both directions, and the like. Even with petroleum acids, the mechanism is not entirely clear. For example, it would seem evident that a higher acid number of a given crude oil, either by nature or due to the addition of a known acid, would lower its interfacial tension. However, Cooke, Williams, and Kolodzie, J. Petrl. Tech. 26 (12), 1365 (1974) found that though in-situ oxidation with air further increases the acid number of a given crude oil, this artificially created high-acid-number crude oil could not successfully be flooded with alkaline water.

The present invention provides means for tertiary oil recovery useful over a relatively wide pH range and which is economical and flexible. Specifically, the invention proceeds by isolating the native petroleum fractions responsible for lowering the interfacial tension of petroleum in aqueous alkaline systems. The fractions are isolated from petroleum of the type having reduced interfacial tension with water at high pH, for example, 2-30 dynes/cm., or less. A non-aqueous slug is formed by subjecting petroleum of such type to fractionation by distillation including distillation under vacuum, e.g. 1 mm of Hg (1Torr), in a certain temperature range and recovering a surfactant fraction of the petroleum distilled in that temperature range. The temperature range critically is 100°–200° C. under a vacuum of 1 Torr, or equivalent pressure and temperature. It is believed that such distillation results in separation of the desired petroleum fraction with no or minimum destruction of the structure of the molecules constituting the fraction. The fraction forms a surfactant when contacted with aqueous alkaline, its surfactant character increasing rapidly with time upon such contact and thereafter decreasing. Accordingly, the fraction can be injected as a slug into the reservoir, followed by alkaline waterflooding. The fraction can itself constitute the slug or can be mixed with petroleum to from a slug (for example, at a level of one part fraction to 10 to $10^4$ parts of petroleum). The petroleum can be obtained directly from that reservoir.

In a further embodiment, the fraction is further concentrated by removing benzene-soluble components to obtain as a surfactant portion of said fraction an ether-soluble residue having a density greater than water. Whereas the fraction itself can constitute, as an example, about 30% of the petroleum from which it is derived, the ether-soluble residue constitutes, again by way of example, about 10% of the fraction. The residue, i.e., concentrate, can under certain circumstances be used itself as a slug, or it can be mixed with petroleum to form a slug (for example, at a level of one part concentrate to 10 to $10^6$ parts petroleum) or can be mixed with the fraction itself (for example, at a level of one part concentrate to 1 to $10^3$ parts fraction) to provide an enriched fraction, and either form can be used as a slug as above.

It will be appreciated that the fraction separated by the foregoing method comprises natural components of the petroleum and this gives rise to a significant advantage enabling the fraction or residue concentrate to be used for surfactant purposes other then tertiary oil recovery. Surfactants are used to prevent or treat certain types of well formation damage, but if the wrong surfactant is used, damage can be caused or aggravated. For example, such damage as oil-wetting of formation rock, interfacial film or membrane blocks, and particle blocks due to flocculation can all be caused or aggravated by using the wrong surfactant for a particular well. The native petroleum fraction cannot suffer such drawbacks because it is native to the petroleum itself. The fraction can be stored as such, or reacted with alkali to form an anionic surfactant material and then stored. Subsequently, the surfactant can be used for well work.

It is believed that neither the fraction nor the concentrate therefrom have been previously isolated as such, and hence constitute new compositions of matter, as do the mixtures with petroleum and as does the fraction enriched with the concentrate. While it is not desired to be limited to any particular theory, it is believed that the fraction and concentrate contain hydrogen displaceable components including one, two, three or four of the following component types:

R—SH

R—OH

in which R is a hydrocarbon of 3 to 20 carbon atoms, $R_1$ is hydrogen or a hydrocarbon of 3 to 20 carbon atoms, and R and $R_1$ are either separate or cyclically-combined.

Injection of the slug proceeds in accordance with known methods of slug injection and is followed by alkaline waterflooding as known to the art. Preferably the alkalinity is at least 10.9 pH and the floodwater preferably contains at least 100 ppm. of a halide salt such as sodium chloride. The salt serves to act as a common ion preventing the removal of alkali by precipitation in the pesence of divalent ion such as calcium or magnesium. It is a characteristic of the native surfactant fraction that the optimum interfacial tension extends throughout a relatively broad pH range. By way of example, a particular native surfactant fraction can have an optimum interfacial tension when measured in water, containing 7500 ppm NaCl, of less than 0.03 dynes/cm. throughout a pH range of 0.5 pH units or more; the crude from which it is obtained exhibits that level of interfacial tension over a narrower pH range of approximately 0.2 pH units.

It will be appreciated that the present invention can be practiced at the site of the reservoir itself. Crude petroleum recovered from the reservoir by primary, secondary, or tertiary methods can be subjected to fractional distillation under the conditions outlined above to obtain the native surfactant fraction. Where the reservoir has been subjected to alkaline flooding, the recovered oil can be separated from the alkaline solution and the oil subjected to distillation. Optionally one can further separate the aforementioned residue, for example, by elution, to obtain the surfactant concentrate. The alkaline water can then be recycled for further flooding after the injection of a slug comprising the surfactant.

It will also be appreciated that the method described above for separation of native surfactant by fractional distillation can be used to determine the amenability of a particular subterranean reservoir to recovery by alkaline waterflooding. The extent to which alkaline waterflooding can be effective can be determined by measuring the degree of reduction in interfacial tension exhibited by the native petroleum fraction. The undertaking of an alkaline waterflooding process involves tremendous capital investment, manpower, and reagent commitment; such an amenability determination can provide the basis for determining whether such commitment is warranted.

Other advantages and details of the invention will become apparent in accordance with the following description.

BRIEF DESCRIPTION OF THE DRAWINGS

FIG. 3 is a graph illustrating the aging of the surfactant following contact with alkaline; and FIG. 4 illustrates the effect on interfacial tension with water of the benzene eluted cut and ether-solubleresidue obtained from the distillation fraction.

DETAILED DESCRIPTION

Figure 1:
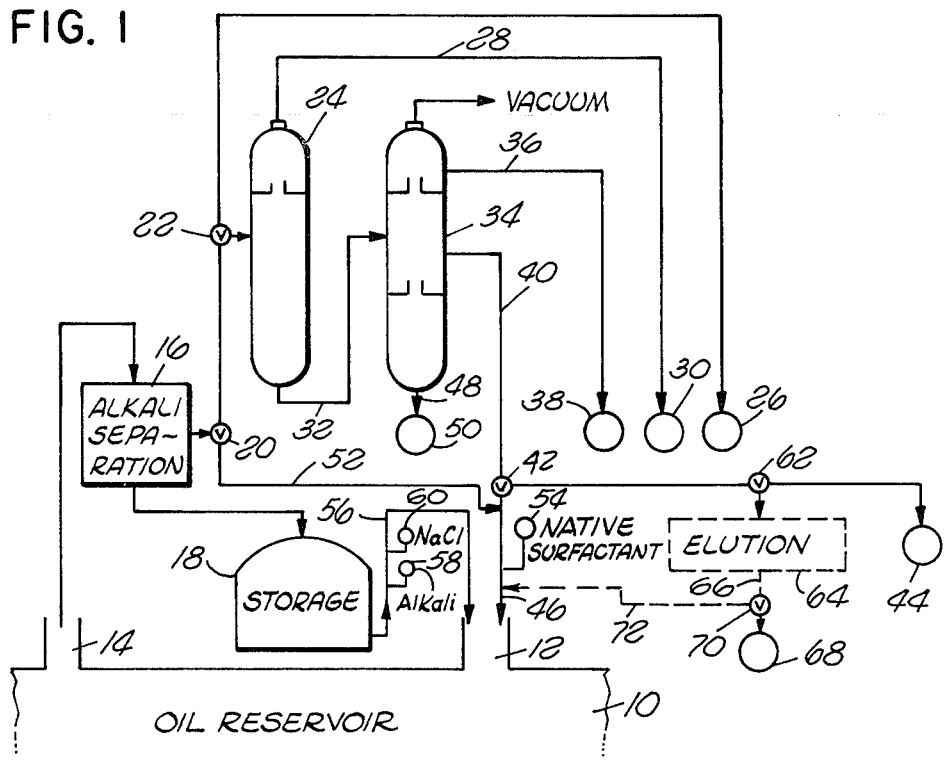
FIG. 1 is a schematic representation of the present process operated at the site of a subterranean oil reservoir.

Referring to FIG. 1, the present process is illustrated at the side of a subterranean oil reservoir 10. A plurality of injection wells are provided, one of which is indicated at 12 and a plurality of production wells are provided, one of which is indicated at 14.

The particular oil reservoir illustrated is one from which oil has been obtained by primary recovery as well as by secondary recovery methods such as simple water-flooding. In this example, tertiary recovery has been attempted using alkaline floodwater resulting in the further recovery of petroleum but at relatively high water to oil ratios. A water-oil mixture obtained from such tertiary recovery is led to an alkaline separation station 16 where the oil is separated. The alkaline solution is led to a storage tank 18 and the oil is led via valves 20 and 22 to a first distillation unit 24. Alternatively, the valve 22 can be manipulated so that a portion of the oil, or all of it if sufficient surfactant has been produced, can be diverted to storage, indicated at 26.

The crude petroleum is initially distilled at atmospheric pressure to remove excess water and low boiling volatile components, indicated by the line 28, which are led to storage, indicated at 30. The remainder of the petroleum is led over the line 32 to a second distillation unit 34 where it is distilled at about 1 Torr vacuum to yield a fraction distilling in the range of 40°–130° C. and another fraction distilling in the range of 100°–200° C. While these general ranges include some overlap, for a particular crude petroleum there will be little, if any, overlap in the distillation range, as will be illustrated further hereinbelow. The lower fraction is led over the line 36 to storage, indicated at 38. The higher fraction is led over a line 40 to a valve 42 from where it can be diverted to storage, indicated at 44, for subsequent use, or can be injected directly over line 46 into the injection well 12. The residue from the fractionation is led over a line 48 to storage, indicated at 50. Each of the components stored at 30, 38, and 50 can be further processed into useful products as can the petroleum stored at 26, all in accordance with usual and known petroleum refining practices.

The fraction distilling in the range of 100°–200° C. (hereinafter called the native surfactant fraction) can be directly injected as a slug into the injection well 12 and from there into the reservoir. Alternatively, depending upon such factors as the rate of oil recovery and the extent to which the alkaline floodwater penetrates through the slug, one can mix the native surfactant fraction with petroleum, for example, by diverting petroleum via the valve 20 over line 52 to the line 46 to mix with the native surfactant fraction. The valves 20 and 42 can be arranged to provide any degree or metering desired and as may be found necessary by experience.

In order to obtain a native surfactant fraction as above described, the oil that is subjected to fractional distillation, must be of the type having a reduced interfacial tension with water at high pH. If the oil in the reservoir is not of such type, or if insufficient oil is recoverable by normal alkaline flooding to provide sufficient native surfactant fraction, then a separate supply of native surfactant can be provided as indicated at 54. This can be injected directly into the reservoir or can be mixed with petroleum when such is recovered, as obtained over the line 52.

An amount of slug is injected that will provide an emulsion when followed by alkaline waterflooding sufficient to penetrate into the more permeable strata of the reservoir a distance which depends on the reservoir and foramtion strata. The amount of the emulsion penetrating individual strata will depend upon the permeability of the strata in communication with the injection well. In this regard, the amount used can be determined approximately from conventional usage of conventional surfactants and adjusted in accordance with experience.

The flooding operation conducted following the injection of the slug is practiced in conventional manner. While the alkaline floodwater stored at 18 can be conveniently used, it will be appreciated that any suitable alkaline floodwater can be used, such as any conveniently available brine, and that the floodwater can contain various ingredients as may be found useful for the particular reservoir, such as water-soluble polymers exhibiting viscosity characteristics facilitating spreading of the emulsion, or the like. In this particular case, alkaline floodwater from storage is led over the line 56 to the injection well 12. Additional alkali can be added from a source thereof, indicated at 58. As previously indicated in the Summary, it may be desirable to add a halide salt such as sodium chloride and this can be provided from a source as indicated at 60. After the injection of a slug and alkaline flooding, a further injection of slug can be made followed by further alkaline flooding and the process can be continuously operated in that manner. It will be appreciated that after a certain number of passes through the reservoir, the alkaline solution may contain sufficient halide salt and alkaline content as to be completely self-sustaining.

In a further embodiment of the invention, all or a portion of the native surfactant fraction can be diverted via the valve 42 and a valve 62 to an elution station, indicated at 64. At the elution station, the native surfactant fraction is further fractionated to remove benzene-soluble components and recover an ethersoluble residue. In a specific procedure, the native surfactant fraction can be charged to a silica gel column and initially eluted with benzene. The column can subsequently be eluted with ether to obtain the non-aqueous residue (hereinafter referred to as surfactant concentrate) which is found to have a density greater than water. The surfactant concentrate is led over a line 66 to storage, indicated at 68. Alternatively, it can be diverted by means of a valve 70 to a line 72 which connects with the line 46 for mixture thereof with either the native surfactant fraction or with petroleum obtained from the alkali separation station. Such mixture can constitute a slug for injection into the reservoir. As will be brought out further below, the surfactant concentrate constitutes the active component of the native surfactant fraction and by the arrangement described herein, one can enrich the native surfactant fraction or can enrich the natural surfactant properties of the recovered petroleum for use of the petroleum as a slug. Whereas the native surfactant fraction constitutes a large portion of the petroleum, for example, for a particular crude it can constitute about 30%, the surfactant concentrate is only a very small fraction of the petroleum, for example, about 3% of the crude petroleum. Accordingly, economics will usually dictate that the surfactant concentrate be used by mixture with either the native surfactant fraction or with petroleum. On the other hand, there can be circumstances where it is economically feasible to extract sufficient surfactant concentrate to use it directly as a slug, unmixed with the native surfactant fraction or with petroleum. For example, during primary or secondary recovery, looking toward eventual tertiary procedures, one could separate out relatively large amounts of surfactant concentrate. Also, the surfactant is not destroyed by reaction with the alkali, but is recoverable. Accordingly, as the process continues, surfactant continuously builds up and a point can be reached where sufficient surfactant concentrate can be separated to substantially constitute the slug. With particular formations and strata structures, there may be advantages to using the surfactant concentrate directly as a slug. Such advantages result from the fact that the surfactant concentrate has a density greater than the alkaline floodwater and can thus serve to inhibit breakthrough of the flooding medium, minimizing the effect of inhomogenities in the various layers of strata.

Either the native surfactant fraction or the concentrate, alone or diluted, can be used as an additive to oil reservoirs in which the petroleum does not have a reduced interfacial tension with water at high pH.

The following examples will further illustrate the invention.

EXAMPLES 1–3

Fresh crude petroleum samples were obtained from production wells at the Huntington Beach field, a major oil accumulation lying on the California coastline approximately twenty miles southeast of Los Angeles. The field has a length of seven miles along the Newport-Inglewood Fault Zone and a maximum width of three miles. Production in the offshore area is from five major zones with the upper zone assisted by steam injection while three of the lower zones are under waterflood and the remaining lower zone is producing on primary. Petroleum employed in Example 1 is from the Upper Jones Reservoir, recovered by waterflood. Petroleum employed in Example 2 is primary recovery oil from the Upper Main Zone Reservoir. Petroleum employed in Example 3 is from the Lower Main Zone Reservoir, recovered by waterflood. The foregoing zones are at 3500, 4500, and 4800 feet depths, respectively.

The crude in each sample was initially distilled at amospheric pressure to remove excess water and lower boiling components. The remainder was vacuum distilled at 1 mm. (1 Torr) to yield a second fraction distilling in the range of 40°–130° C. A third fraction distilled at that vacuum in the range of 100°–200° C. The distillation range for each of the fractions for each of the examples is given in Table 1:

TABLE 1

|  | Overhead Temperature, °C. | | |
| --- | --- | --- | --- |
|  | Ex. 1 | Ex. 2 | Ex. 3 |
| Distillate #1 | 72–97 | 67–157 | 64–162 |
| Distillate #2 | 90–105 | 60–125 | 46–110 |
| Distillate #3 | 127–175 | 133–171 | 118–156 |

Table 2 below indicates the percentage recovery of each of the fractions:

TABLE 2

|  | Percent Recovery of Fractions | | |
| --- | --- | --- | --- |
|  | Ex. 1 | Ex. 2 | Ex. 3 |
| Distillate #1 | 16.8 | 8.1 | 16.8 |
| Distillate #2 | 10.1 | 7.1 | 25.1 |
| Distillate #3 | 48.2 | 50.4 | 30.5 |
| Gas-Oil | 6.9 | 11.3 | 12.6 |
| Resin | — | 14.3 | 0.7 |
| Asphaltene | 2.7 | 3.6 | 7.7 |
| Benzene Insolubles | 9.6 | — | 0.2 |

The nonvolatile residue was subjected to solvent fractionation into gas-oil, resin, asphaltene, and benzene insolubles.

The ratio of volatiles (distillates) to non-volatiles (gas-oil, resin, asphaltene, benzene-insolubles) of the samples which have undergone waterflooding, is consistent (3:1) when compared with that (2:1) of a primary recovery. In order to test the integrity of all the fractions, both NMR and IR techniques were applied. When the hydrogen per carbon atomic ratio obtained from elemental analysis is plotted against the carbon aromaticity obtained from NMR, and plotted against the extent of hydrogen saturation obtained from IR, a linearity observed within the fractions suggests that no cracking or condensation occurred during the separation processes.

Interfacial tension activity with alkaline water was measured using the spinning drop method. In this method, the shape of a drop of liquid in a more dense liquid (e.g., the distillate in water) is measured as the liquid is contained in a rotating horizontal tube. The method is described by Cayias et al. in "The Measurement of Low Interfacial Tension via the Spinning Drop Technique", in Tech. Bull., University of Texas, Austin. The measurements were conducted in distilled water, as well as in a solution containing 7500 ppm sodium chloride, each with an alkalinity of sodium orthosilicate ranging from 60 to 60,000 ppm, coresponding approximately to a pH range of 10.7–12.7. The correspondence of pH range to concentrate of sodium orthosilicate and other alkaline materials is known in the literature, see for example, FIG. 1 of Sarem U.S. Pat. No. 3,876,002, incorporated herein by reference. The 7500 ppm sodium chloride concentration is an optimum salt concentration to minimize sodium orthosilicate requirements. While sodium orthosilicate is used to impart alkalinity, it will be appreciated that any alkaline material can be utilized. For example, such materials as sodium or potassium hydroxides, potassium orthosilicate, sodium or potassium metasilicate, sodium or potassium metasilicate pentahydrate, and sodium or potassium sesquisilicate could alternatively be used. Sodium orthosilicate is particularly preferred because of its economics and its relatively high pH.

Distillate #1 in each sample showed no interfacial tension activity and only little interfacial tension activity was found for distillate #2. On the other hand, distillate #3 in each sample was found to have not only high surfactant properties providing very low interfacial tensions but also displayed these low results over a wide pH range. Example #3 can be taken as typical. In this example, distillate #1 showed little response in all test solutions. Distillate #2 in distilled water at 500 ppm sodium orthosilicate yielded a value of 0.54 dyne/cm. but showed no interfacial tension response in lower ranges of alkalinity. In the presence of 7500 ppm of salt, the interfacial tension of distillate #2 was lowered to 0.07 dyne/cm., but again there was no response below 250 ppm sodium orthosilicate. On the other hand, distillate #3 showed an excellent response exhibiting very low interfacial tension values over a wide pH range. Interfacial tension measurements with respect to distillate #3 of Example 3 and with respect to the original crude oil are shown in FIGS. 2 and 3.

Figure 2:
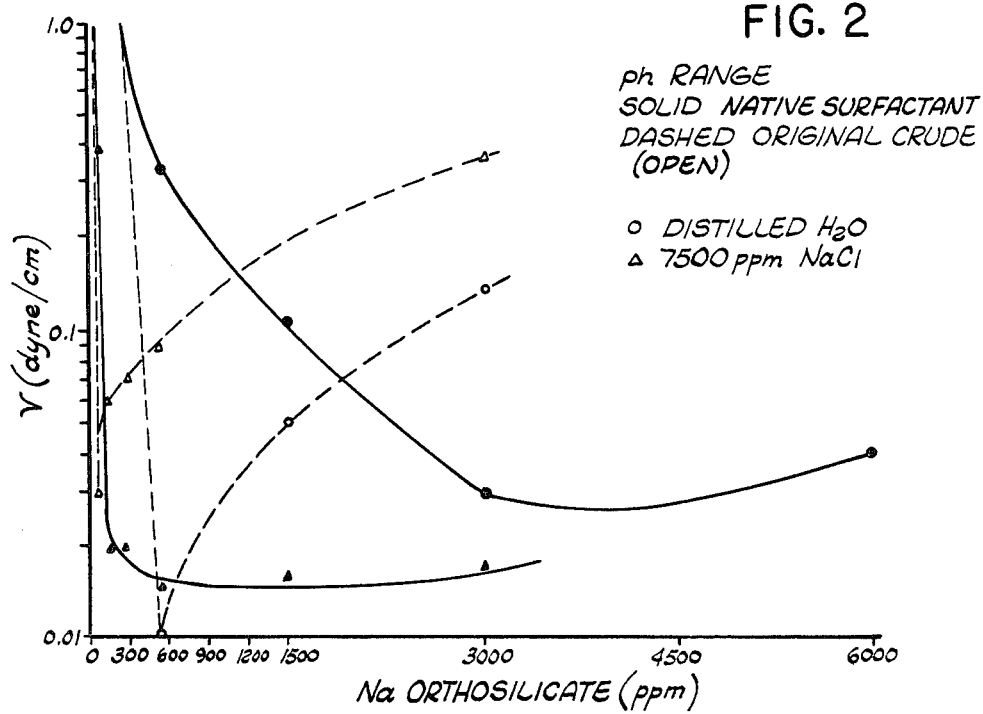
FIG. 2 is a graph illustrating the relationship between interfacial surface tension with water at various alkalinity levels, expressed to terms of the concentration of sodium orthosilicate, for crude oil and for the native petroleum fraction obtained by fractional distillation.

Referring to FIG. 2, it will be seen that the original crude exhibits an ultra-low interfacial tension value against distilled water at about 500 ppm (11.6 pH), but which is exceedingly narrow in pH range. Against water containing 7500 ppm sodium chloride, the original crude showed a somewhat higher interfacial tension value of 0.03 dyne/cm. at about 100 ppm sodium orthosilicate (about 10.9 pH), but there too the activity is exceedingly narrow in pH range. On the other hand, distillate #3, the native petroleum fraction, exhibited interfacial tensions against water containing 7500 ppm sodium chloride below 0.02 dyne/cm. over a wide range from about 200 ppm sodium orthosilicate to greater than 3000 ppm sodium orthosilicate (approximately 11.1–12.4 pH). The interfacial tension was in fact lower than that for the crude against the salt water albeit higher than compared to the crude when measured against distilled water. The native surfactant when measured against distilled water displayed a useful decrease in interfacial tension over a wide pH range particularly at the higher pH ranges.

In FIG. 2, each measurement in dynes/cm. is the minimum of a time dependent function. That function is illustrated in FIG. 3 in which are plotted aging data for the interfaces at optimum concentrations of sodium orthosilicate (OS) over a time range of 2–40 minutes. These results demonstrate that the native surfactant fraction undergoes spontaneous emulsification. England and Burg, AIChE J. 17, 313 (1971) attribute the phenomenon of spontaneous emulsification of surfactants to the transfer of surfactant against the interface with a large desorption barrier when tension drops continuously. In the present case, a rapid increase in tension is found to be accompanied by single drop instability which suggests a rapid coalescence process for emulsification. As pointed out by Schechter and Wade, ERDA Report, EG-76-S-0031, 1976, systems which emulsify and rapidly coalesce spontaneously give better oil recovery than those which form stable emulsions spontaneously.

EXAMPLE 4

The native surfactant fraction, distillate #3, of Example 3 was further fractionated utilizing open column silica gel chromatography. The native surfactant fraction was charged to a silica gel column initially eluted with benzene. The resultant benzene fraction from this elution was composed of 90% by weight of the original distillate fraction. The column was subsequently eluted with ether which gave the remaining 10% of the distillate.

An attempt was made to determine the interfacial tension response of the benzene and ether eluted fractions. The ether fraction had a density greater than water and therefore interfacial tension data was not obtainable using the spinning drop method. However, since the original distillate was composed of a 90% benzene fraction and a 10% ether fraction, a cut containing 95% of the benzene eluted fraction and 5% of the ether eluted fraction was reconstructed. The interfacial tension data from this reconstructed cut was obtained as was that of the benzene eluted cut and compared to the data for the original native surfactant. The results are shown in FIG. 4 where it can be seen that whereas the benzene eluted cut has little activity, particularly below 1000 ppm sodium orthosilicate (approximately 11.8 pH), the reconstructed cut approaches the original distillate. These data indicate that the ether eluted fraction is primarily responsible for the good interfacial tension activity of the native surfactant fraction, distillate #3.

EXAMPLES 5-6

Distillate #3 of Example 3 and the ether-eluted fraction of Example 4 each can be reacted with a stoichiometric excess of sodium hydroxide, or other alkali, stored, and then used as a surfactant for well work at the Lower Zone Reservoir of the Huntington Beach field.

We claim:

1. In a process for recovering petroleum from a subterranean reservoir thereof penetrated by at least one injection well and at least one production well spaced apart in the reservoir in which a liquid slug is injected through said injection well into said reservoir followed by the injection of alkaline floodwater whereby to displace oil from said reservoir for recovery through said production well, the improvement according to which said slug is non-aqueous and comprises at least a surfactant portion of a fraction consisting essentially of natural components of petroleum, said fraction being distilled under conditions equivalent to vacuum of about 1 Torr in the temperature range of 100°–200° C. from petroleum of the type having reduced interfacial tension with water at high pH.

2. The improvement according to claim 1 in which said surfactant portion exhibits an optimum interfacial tension, when measured in water containing 7500 ppm NaCl, of less than 0.03 dyne/cm throughout a pH range of at least 0.5 pH units.

3. The improvement according to claim 1 in which said slug comprises petroleum mixed with said surfactant portion.

4. The improvement according to claim 1 in which said slug comprises said fraction.

5. The improvement according to claim 1 in which said surfactant portion includes at least one of the component types:

R—SH

R—NH

R—OH

R—COH wherein R is a hydrocarbon of 3 to 20 carbon atoms, $R_1$ is hydrogen or a hydrocarbon of 3 to 20 carbon atoms, and in which R and $R_1$ are either separate or cyclically combined.

6. The improvement according to claim 5 in which said surfactant portion includes each of said component types.

7. The improvement according to claim 1 in which said surfactant portion has a density greater than water and comprises an ether-soluble residue obtained by removal of benzene-soluble components from said fraction.

8. The improvement according to claim 7 in which said removal is accomplished by elution.

9. The improvement according to claim 7 in which said slug comprises petroleum mixed with said surfactant portion.

10. The improvement according to claim 7 in which said slug comprises said fraction enriched with additional amounts of said surfactant portion.

11. The improvement according to claim 7 in which said surfactant portion includes at least one of the component types:

R—SH

R—NH

R—OH

R—COH wherein R is a hydrocarbon of 3 to 20 carbon atoms, $R_1$ is hydrogen or a hydrocarbon of 3 to 20 carbon atoms, and in which R and $R_1$ are either separate or cyclically combined.

12. The improvement according to claim 11 in which said surfactant portion includes each of said component types.

13. The improvement according to claim 11 in which said fraction is obtained by distillation of crude petroleum native to said reservoir.

14. In a process for tertiary recovery of petroleum from a subterranean reservoir containing petroleum of a type having reduced interfacial tension with water at high pH, which reservoir has been penetrated by at least one production well, and by at least one injection well into which has been injected flooding medium for recovery of petroleum native to said reservoir, the improvement comprising:

subjecting said recovered crude native petroleum to fractionation by distillation including distillation under conditions equivalent to vacuum of about 1 Torr in the temperature range of 100°-200° C.;

recovering a surfactant fraction of said petroleum distilled in said temperature range and consisting essentially of natural components of said native petroleum;

injecting a non-aqueous slug comprising at least a surfactant portion of said fraction through said injection well into said reservoir; and thereafter injecting alkaline floodwater through said injection well into said reservoir whereby to produce petroleum through said production well.

15. The process of claim 14 including the step prior to said fractionation of separating flood medium from said recovered crude petroleum.

16. The process of claim 14 in which said petroleum is mixed with said surfactant portion to constitute said slug.

17. The process of claim 14 in which said alkaline floodwater has a pH of at least 10.9.

18. The process of claim 17 in which said alkaline floodwater includes a halide salt.

19. The process of claim 18 in which there is present at least 100 ppm of said salt as sodium chloride.

20. The process of claim 14 in which said slug comprises said fraction.

21. The process of claim 14 in which said surfactant fraction includes at least one of the component types:

R—SH

R—OH

$$R-\overset{O}{\overset{\|}{C}}OH$$

wherein R is a hydrocarbon of 3 to 20 carbon atoms, $R_1$ is hydrogen or a hydrocarbon of 3 to 20 carbon atoms, and in which R and $R_1$ are either separate or cyclically combined.

22. The process of claim 21 in which said surfactant fraction includes each of said component types.

23. The process of claim 14 including the step of removing benzene-soluble components from said fraction to obtain as a surfactant portion of said fraction an ether-soluble residue having a density greater than water.

24. The process of claim 23 in which said benzene-soluble components are removed by elution.

25. The process of claim 23 in which said petroleum is mixed with said surfactant portion to constitute said slug.

26. The process of claim 23 in which said fraction is enriched by mixing with said surfactant portion to constitute said slug.

27. The process of claim 23 in which said surfactant portion includes at least one of the component types:

R—SH

R—OH

wherein R is a hydrocarbon of 3 to 20 carbon atoms, $R_1$ is hydrogen or a hydrocarbon of 3 to 20 carbon atoms, and in which R and $R_1$ are either separate or cyclically combined.

28. The process of claim 27 in which said surfactant portion includes each of said component types.

* * * * *

UNITED STATES PATENT AND TRADEMARK OFFICE
CERTIFICATE OF CORRECTION

PATENT NO. : 4,232,738
DATED : November 11, 1980
INVENTOR(S) : Teh Fu Yen and Paul A. Farmanian It is certified that error appears in the above-identified patent and that said Letters Patent are hereby corrected as shown below:

Column 2, line 1, delete "to tolerances" and substitute --in tolerances--.
Column 4, line 29, delete "expressed to terms" and substitute --expressed in terms--.

Column 5, line 42, delete "foramtion" and substitute --formation--

Column 5, line 54, delete "containvarious" and substitute --contain various--.

Signed and Sealed this

Twenty-third Day of June 1981

[SEAL]

Attest:

RENE D. TEGTMEYER

Attesting Officer

Acting Commissioner of Patents and Trademarks